April 28, 1931.  W. FINKELSTEIN  1,802,912
TRAVELING BAG, SUITCASE, HAND BAG, OR THE LIKE
Filed Sept. 27, 1926  3 Sheets-Sheet 1
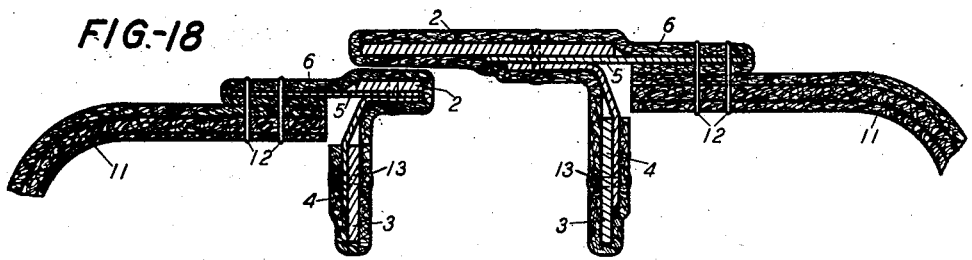
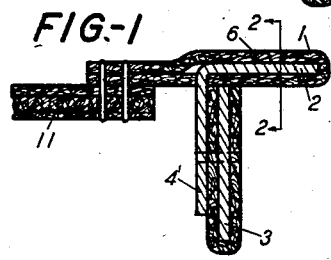
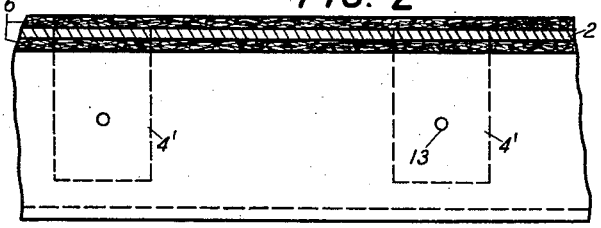
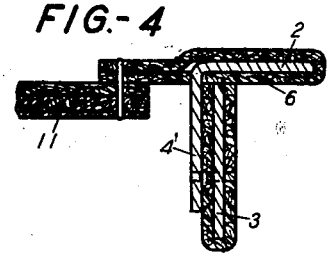
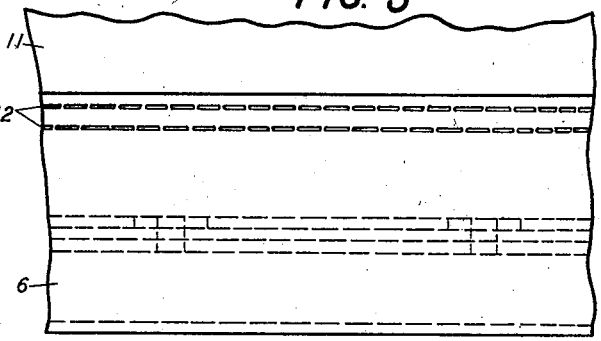
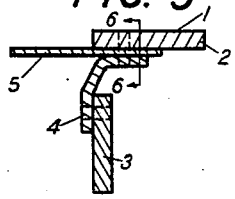
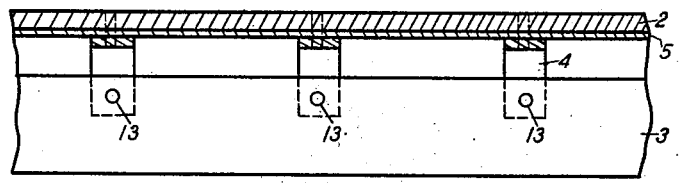
INVENTOR.
WILLIAM FINKELSTEIN
BY
ADCaesar
ATTORNEY April 28, 1931. W. FINKELSTEIN 1,802,912
TRAVELING BAG, SUITCASE, HAND BAG, OR THE LIKE
Filed Sept. 27, 1926 3 Sheets-Sheet 2
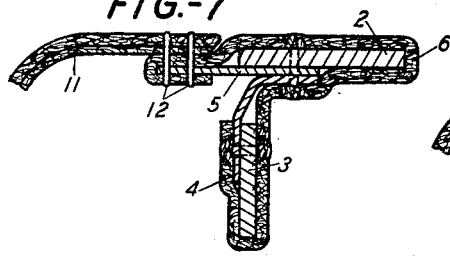
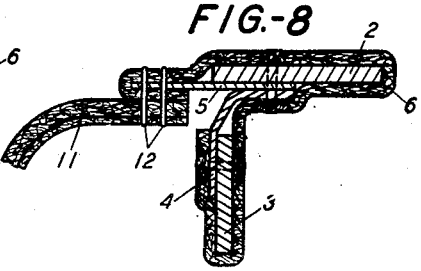
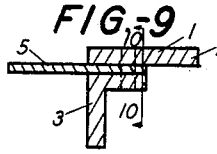
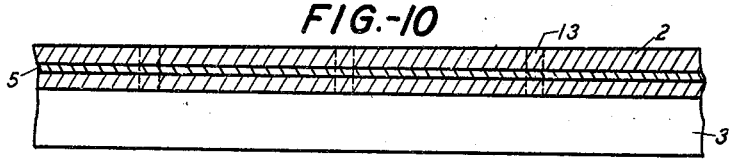
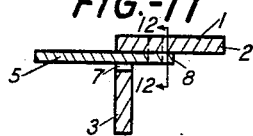
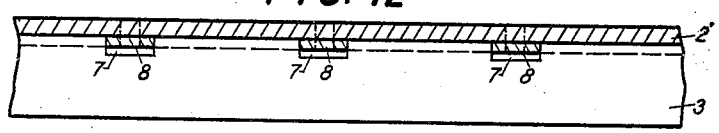
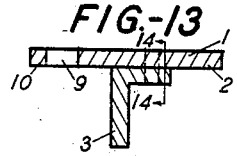
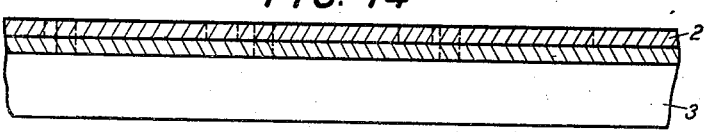
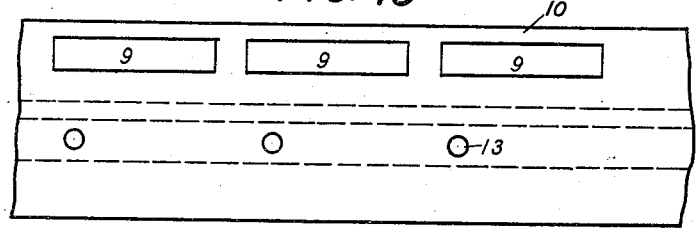
INVENTOR.
WILLIAM FINKELSTEIN
BY
ATTORNEY April 28, 1931. W. FINKELSTEIN 1,802,912
TRAVELING BAG, SUITCASE, HAND BAG, OR THE LIKE
Filed Sept. 27, 1926 3 Sheets-Sheet 3

INVENTOR.
WILLIAM FINKELSTEIN
BY
*A.D.Caesar*
ATTORNEY

Patented Apr. 28, 1931

1,802,912

UNITED STATES PATENT OFFICE

WILLIAM FINKELSTEIN, OF PHILADELPHIA, PENNSYLVANIA

TRAVELING BAG, SUITCASE, HAND BAG, OR THE LIKE

Application filed September 27, 1926. Serial No. 138,018.

This invention relates to the construction of traveling bags, hand bags, suit cases and the like and has for its object the production of a stronger bag and one which may be more easily assembled by providing both a new and improved method of attaching the leather to the frame and also a new and improved frame whereby certain difficulties now existing in the present are overcome and certain points of weakness are removed.

In the present practice of making traveling bags, hand bags, suit cases or the like, the bag is assembled as a unit, the frame is assembled as a unit and the bag is then attached to the frame by stitching or other well known means.

Before the leather is attached to the frame the edges which are to be so attached are first skived or beveled to make a better fit with the frame and the line of stitching which joins the bag part with the frame part passes through the part so skived.

This results in certain well marked disadvantages and certain weaknesses of construction of which the following may be mentioned.

First the leather so skived is thinner than the remaining portion and is therefore weaker.

Secondly because the stitching is through the skived edge the fabric lining or backing which is attached to the leather does not receive any stitching whatsoever and therefore has a tendency to dribble and produce frayed edges.

Thirdly, since the stitching is only through the skived edge the bag not only is weakened because it is held by thinner leather but also because the additional strengthening and reinforcing fabric lining has not been pierced.

To remove these and other weaknesses of construction known to those in the art the applicant has provided a bag having sewing flanges attached to the frame and connects the bag portion to the same by a plural number of rows of stitching.

In order to strengthen the sewing flange and to provide a stronger bag the applicant has devised a new and improved frame which serves to facilitate the construction of the bag and at the same time to remove certain weaknesses in the type of bag having a sewing flange.

The bags made in the art at present which have a sewing flange have the same as a strip of leather folded around the frame and attached to the frame by pasting or other means. The bag structure is then stitched directly to the sewing flange by means of a single line of stitching—the bag portion being placed over the auxiliary sewing flange.

This results in certain weaknesses of construction of which the following are mentioned:—

First:—The bag portion being attached to the leather auxiliary sewing flange the said flange must take the entire strain.

Secondly:—The bag portion is skived as previously outlined and connected by only a single line of stitching with the resultant weaknesses outlined above.

Thirdly:—Since the attaching flange only but not the bag per se is attached to the frame, the wearing off or cutting of even the upper part of the attaching flange between the frame and the point of attachment of the bag would result in the severance of the bag portion from the frame portion.

Fourthly:—Since the bag portion is attached over the auxiliary attaching flange, as stated before, rain water which falls upon the bag finds its way into the bag at the seams between the attaching flange and bag portion and in so doing causes the bag material to deteriorate if it does not actually wet the contents thereof.

To remove these and other points of weakness the applicant has provided a novel frame a portion of which at least is made of penetrable material and the novel method of attaching the bag structure to the frame which consists in attaching an auxiliary attaching flange to the frame and then connecting the bag structure to either over or under the frame and auxiliary attaching flange by means of either a single or double row of stitching or other attaching means.

More specifically some of the objects of this invention are:—

The production of a stronger bag and one more easily made by providing a novel method of attaching the leather to the frame.

The production of a more weather-proof bag by providing a novel method of attaching the leather to the frame.

The production of a new and improved frame whereby the frame is adapted to serve as an additional strengthening element in the novel attachment of the leather of the bag portion to the same.

The above and other advantages and objects of the invention will become clear from the following specifications and drawings, which are to be construed as for the purpose of illustration and not limitation, in which Figure 1, is a section through the frame and fragment of the bag taken at right angles to its length. This section shows a double row of stitching for which other attaching means may be substituted without departing from the spirit of my invention.

Figure 2, is a fragmentary section taken on the line 2—2 of Figure 1—(parallel to the length of the frame).

Figure 3, is a fragmentary top view of the portion of the frame shown in Figure 2.

Figure 4, is a view similar to Figure 1 showing only a single line of stitching for which other attaching means may be substituted without departing from the spirit of my invention.

Figure 5, is a section through another type of frame per se taken at right angles to its length.

Figure 6, is a fragmentary section taken along the line 6—6 of Figure 5 and parallel to the length of the frame.

Figure 7, is a section similar to Figure 5 but showing the auxiliary flange and bag attached.

Figure 8, is a section taken in a manner similar to that of Figure 7 but showing the bag section attached over the auxiliary sewing flange and frame section.

Figure 9, is a section of another modification of the frame taken at right angles to its length.

Figure 10, is a fragmentary section taken along the line 10—10 of Figure 9, parallel to the length of the frame.

Figure 11, is a section of still another modification of the frame taken at right angles to its length.

Figure 12, is a fragmentary section taken along the line 12—12 of Figure 11, parallel to the length of the frame.

Figure 13, is a section of still another modification of the frame taken at right angles to its length.

Figure 14, is a fragmentary section taken along the line 14—14 of Figure 13, parallel to the length of the frame.

Figure 15, is a top view of the fragmentary portion of the frame shown in Figure 14.

Figure 18 is a section on the line 18—18 of Figure 17.

Figure 16:
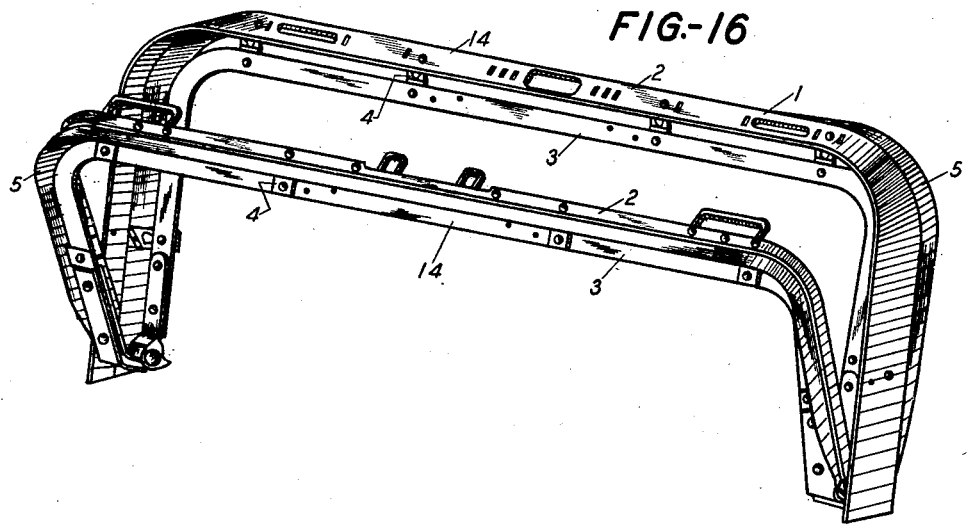
Figure 16 is a perspective view of the T shaped frame which is illustrated as being made up of two frame sections.
Figure 17:
Figure 17 is a perspective view of the new hand-bag.

In the said drawings reference numeral 1 indicates the entire frame which may be angle shaped as in Figures 1 and 2, or T shaped as in the remaining figures.

The frame proper is made of the usual two sections which are hinged together in the manner well known in the art. (See for example U. S. Patent #1,032,677 to Holman granted July 16, 1912.) In the applicant's novel frame each of these sections is made up of a top piece 2, a bottom piece 3, which is connected to the top piece 2 by a bracket 4 (see Figures 5 and 6) or which may be formed of one piece with the top piece (see Figures 11 and 12) or may be in the form of an angle (see Figures 9 and 14). Riveted (by rivets 13) or otherwise secured to the L shaped frame is an auxiliary strip of material 5. This piece of material may be penetrable as in Figures 5 to 12 inclusive or may be a strip having a plurality of spaced openings therein as in Figures 13 to 15. (Definition: The term "penetrable", as used in the specifications and claims, is used as an adjective to denote the characteristic of being capable of being displaced by a needle in a stitching operation.) This piece if penetrable may also be a piece originally separate from the frame as in Figures 5 to 12 inclusive or integral with all or a portion thereof as in Figures 13 to 15. When attached to the L frame portion this completes the applicant's improved frame and generally forms a T shaped frame as shown. In each of the above cases the sections making up the frame are united by rivets or other attaching means. All of the above are to be understood as being in the nature of illustrations and not limitations.

Definition: The term "T shaped frame" as used in the specification and claims, is used to denote a frame suggesting a T in cross section being either a perfect T, that is, wherein the two T top members are in the same plane, or, as shown in Figures 5, 9, 11 or 16, a T wherein one of the T top members is off-set with respect to the other.

The frame is now ready for the novel method of attaching the leather portion.

An auxiliary strip 6 is secured to the frame. This may be of leather or cloth or any material which is used in the production of bags. The auxiliary piece 6 terminates over the auxiliary material 5 as shown. The bag portion proper 11, is then placed preferably under the piece 5 and its associated auxiliary sewing strip 6, and the bag, the auxiliary sewing strip and the frame and its auxiliary strip are secured together by either stitching, riveting, or by any other attaching means. Whether the bag is placed over the auxiliary strip and sewing flange as in Figure 8 or under as in the remaining figures, a plural number of rows of stitching 12, or other attaching means that is at least two rows should be used; but only one row may be used as shown in Figure 4 without departing from the spirit of my invention.

The bag portion may be attached either over or under the piece 5 and its associated piece 6 but as stated before the preferred form is with the bag attached under the same. Such an attachment obviates the necessity of skiving the leather of the bag portion since the joint is not seen.

It further permits the rows of stitching to be placed an appreciable distance from the edge whereby a firm grip upon the leather is assured for even the first row of stitching. Finally it makes a better looking bag since the metal edge serves as a guide by the auxiliary attaching means thus giving a straight line for the joint.

It further makes the bag more weatherproof since the rain water falling on the frame portion is kept from filtering into the seams and the bag. This further prevents deterioration of the bag.

Figures 1 and 2 disclose a modification of the applicant's invention in which only the novel manner of attaching the leather to the auxiliary sewing flange is shown. The frame, of which only a fragmentary portion of one unit has been shown, in this case is composed of two "L" portions—1, which may be formed in any one of the several ways outlined above or may be formed by having brackets 4' integral with the top piece 2 and at right angles thereto as shown. The top piece is first covered with the auxiliary sewing flange 6, the brackets 4' piercing the same and the bottom piece 3 is then attached, the said bottom piece having first been previously covered with some leather fabric or other substance used for the purpose. (It is to be understood that this piece, 3, may be left uncovered if desired.) The bag portion is then attached by preferably a plural number of rows of stitching or other attaching means to the auxiliary sewing flange, the bag portion being generally placed under the attaching flange as shown.

The bag portion may, of course, be placed over the sewing flange section in the manner generally similar to that shown in Figure 8, or it may be attached under the auxiliary sewing flange only one row of stitching being used as shown in Figure 4. In Figures 5 to 15 inclusive, the bag is held not only by the auxiliary sewing strip but also by the frame per se either by the auxiliary strip 5 attached to the frame as in Figures 5 to 12 or by a frame having an extension having perforations therein as in Figures 13 to 15.

Figures 5 to 10 inclusive disclose one of the possible ways in which the auxiliary penetrable piece 5 may be attached to the remainder of the frame. The said auxiliary piece 5 is placed between the top piece 2 and the bottom piece 3, (see Figures 9 to 10) or between the top piece 2 and the bracket 4 connecting the top piece 2 with the bottom piece 3 (see Figures 5 and 6) and the entire assembly is riveted together to form a "T" shaped frame as shown. (See Figures 5 to 10 inclusive.)

In Figures 11 and 12 which show another method of attaching the auxiliary metal strip 5 to the frame, the frame 1 is formed of one piece and has a plurality of openings 7 punched therein as shown. The strip 5 has a plurality of lugs 3 extending therefrom. These fit into the openings 7 in the frame part. The lugs 3 are then secured to the frame 2 by riveting or other means.

In Figures 13 to 15, which disclose a modification in which a plurality of openings have been sustituted for the penetrable strip 5, the bottom portion is formed of an angle shaped piece 3 as shown. The bottom piece 3 is then secured to the top piece 2 by means of rivets or other securing means, in such a manner that the portion of the top piece having a plurality of openings therein extends beyond the bottom piece as shown forming the T shaped frame as shown. The frame is then covered with an auxiliary attaching flange in the usual manner and the bag attached to this assembly as outlined above. In this case the stitches go through the plurality of perforations 9 in the metal frame and around the portion 10 of the frame. The metal thus serves to reinforce the attaching flange as in the case where penetrable metal is used. In each of the above frames rivet holes and rivets to connect the different sections of the frame together are supplied wherever necessary as shown.

Each of the above illustrations is to be understood merely as illustrative of the methods of assembly and as preferred forms rather than as limitations. For it is obvious that certain changes may be made in the same such as for instance substituting a frame consisting of a top piece, a bracket and bottom piece in Figure 13 and making certain other changes and substitutions without departing from the spirit of the invention disclosed in this specification and embodied in the claims.

What I claim as new is:—

1. A frame for hand-bags, traveling-bags, suit-cases and the like,—which hand-bags and the like are composed of a bag-section, a frame and means joining the said bag-section to the said frame,—consisting of a pair of frame-sections hinged together; each said frame-section consisting of a top member, a second member substantially at right angles to the said top member and spaced from the edges of the said top member, whereby each said top and second member together form a T-shaped frame, and connecting means uniting the said top and second members; each said top member consisting of a penetrable and a nonpenetrable strip.

2. As an article of manufacture a traveling bag, hand bag, suit case or the like consisting of a frame, the said frame consisting of a pair of U shaped frame-sections hinged together, each of the said frame-sections consisting of a top-member composed of a penetrable and non-penetrable strip, a bottom member parallel to and spaced from the edges of the said top member whereby the said top and bottom members together form a frame-section T-shaped in cross section, and means simultaneously connecting the said penetrable and non-penetrable strips to the said bottom member; a bag section carried by the penetrable members of each of the said frame sections; and connecting means uniting the said bag section to the penetrable members of each of the said frame sections.

3. As an article of manufacture, a traveling bag, hand bag, suit case or the like comprising a pair of frame sections hinged together, each of the said frame sections being T shaped in cross-section, the T top member of each of the said frame sections consisting of a rigid non-penetrable portion and a penetrable portion; a bag section; and stitched connecting means uniting the said bag section to the said penetrable portion of each of the said frame-sections.

4. As an article of manufacture, a frame for hand-bags, traveling bags, suit cases or the like—which hand-bags are composed of a bag-section, a frame and stitched connecting means uniting the said bag section to the said frame,—consisting of a pair of frame sections hinged together, each of the said frame sections being T shaped in cross section, the T top member of each of the said frame sections consisting of a rigid non-penetrable member and a penetrable member connected together, the said penetrable members adapting the said frame for being stitched to the said bag section.

5. As an article of manufacture a frame for hand bags and the like,—which hand bags are composed of a bag-section, a frame and stitched connecting means uniting the said bag section to the said frame,—consisting of a pair of frame sections hinged together, each of the said frame sections being T shaped in cross section, the T top member of each of the said frame sections consisting of a rigid non-penetrable portion and a penetrable portion, the said penetrable portion adapting the said frame for being stitched directly to the said bag section.

6. As an article of manufacture a frame for hand bags and the like,—which hand bags consist of a bag section, a frame, and stitched connecting means uniting the said bag section to the said frame,—consisting of a pair of frame sections hinged together, each of the said frame sections consisting of the combination of a bag frame jaw, having a top member and a downwardly projecting member, with a penetrable metal strip attached to the said jaw along a line intermediate the top and bottom edges of the said downwardly projecting jaw member and projecting therefrom in a direction opposite that of the said top jaw member, the said penetrable metal member serving as an attaching member for the said bag-section to the said frame.

7. As an article of manufacture a hand bag and the like comprising a pair of frame sections hinged together, each of the said frame sections consisting of the combination of a bag frame jaw, having a top member and a downwardly projecting bottom member, with a penetrable metal strip attached to the said jaw along a line intermediate the top and bottom edges of the downwardly projecting jaw member and projecting therefrom in a direction opposite that of the said top jaw member; a bag section; and stitched connecting means uniting the said bag section to the penetrable metal member of each of the said frame sections.

8. As an article of manufacture a frame for hand-bags and the like,—which handbags are composed of a bag section, a frame and stitches uniting the said bag section to the said frame,—consisting of a pair of frame sections hinged together, each of the said frame sections being T shaped in cross-section, the T top member of each of the said frame sections consisting of a rigid non-penetrable portion and a thin metal penetrable portion, the said penetrable portion adapting the said frame for being stitched directly to the bag section.

9. As an article of manufacture a frame for hand-bags and the like consisting of a pair of frame sections hinged together, each of the said frame sections consisting of a pair of flange like rigid metal members in planes substantially perpendicular to each other and a third member extending from one of the said rigid metal members in a plane substantially parallel to and a direction opposite that of the other of the said rigid metal members and located above the lower edge of that rigid metal member to which it is perpendicular and comprised of a strip of material which material is capable of being displaced by a needle in a stitching operation to allow the needle to penetrate the strip in the operation of stitching a bag thereto, whereby the margin of a bag may be connected to the said strip by a simple stitching operation.

10. As an article of manufacture a hand-bag and the like consisting of a pair of frame sections, each of the said frame sections being T shaped in cross-section, the T top member of each of the said frame sections consisting of a rigid non-penetrable strip extending away from one side of the T vertical member and a thin penetrable metal bag attaching strip extending away from the opposite side of the said T vertical member; the said penetrable strip being composed of material which is capable of being displaced by a needle in a stitching operation to allow the needle to penetrate the penetrable member in the operation of stitching the bag thereto; a bag section; and stitches uniting the said bag section to the said penetrable member of each of the said frame sections.

11. As an article of manufacture a frame for hand-bags and the like,—which hand-bags are composed of a bag section, a frame and stitches uniting the said bag section to the said frame,—consisting of a pair of frame sections hinged together, each of the said frame sections being T shaped in cross-section, each said T shaped frame section consisting of a rigid T vertical member and a T top member; the said T top member of each of the said frame sections consisting of a rigid non-penetrable strip extending away from one side of the said T vertical member and a penetrable bag attaching strip extending away from the opposite side of the said T vertical member; the said penetrable strip being supported with substantial rigidity along its inner margin and composed of material which is non-yielding in its own plane, which is flexible in the plane at right angles thereto, and which is capable of being displaced by a needle in a stitching operation to allow the needle to penetrate the strip in the operation of stitching the said bag section of the hand-bag thereto, whereby the margin of the said bag section may be connected to the said penetrable portion by a simple stitching operation.

12. As an article of manufacture a frame section for hand-bags and the like, the said frame section being substantially T shaped in cross-section and consisting of a substantially rigid T vertical member and a T top member; the said T top member consisting of a rigid non-penetrable strip and a penetrable bag attaching strip, the said rigid non-penetrable strip extending away from one side of the said T vertical member, and the said penetrable strip extending away from the opposite side of the said T vertical member; the said penetrable strip being composed of material which is substantially non-yielding in its own plane, which is flexible in a plane at right angles to its own plane, and which is capable of being displaced by a needle in the operation of stitching a handbag thereto, whereby the margin of the said bag may be connected to the said penetrable strip by a simple stitching operation.

13. As an article of manufacture a frame section for hand-bags and the like, the said frame section consisting of a substantially rigid downwardly extending member and a pair of oppositely extended flanges carried by the said downwardly extending member; one of the said flanges consisting of rigid non-penetrable material and the other of the said flanges consisting of thin metal which is substantially unyielding in its own plane, which is flexible in a plane at right angles to its own plane, and which is capable of being displaced by a needle in a stitching operation to allow the needle to penetrate it in the operation of stitching a bag thereto; the said thin metal flange being supported with substantial rigidity along its inner margin and being offset in a plane below the plane of the said rigid flange.

In testimony whereof I affix my signature.

WILLIAM FINKELSTEIN.